(12) United States Patent
Lu

(10) Patent No.: US 9,021,153 B2
(45) Date of Patent: Apr. 28, 2015

(54) DIRECT MEMORY ACCESS SYSTEM AND METHOD USING THE SAME

(71) Applicant: Ralink Technology Corp., Hsinchu County (TW)

(72) Inventor: Kuo-Cheng Lu, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/899,579

(22) Filed: May 22, 2013

(65) Prior Publication Data

US 2013/0254433 A1   Sep. 26, 2013

Related U.S. Application Data

(63) Continuation of application No. 12/247,019, filed on Oct. 7, 2008.

(30) Foreign Application Priority Data

Feb. 20, 2008  (TW) .............................. 097105859 A

(51) Int. Cl.
*G06F 13/12* (2006.01)
*G06F 15/16* (2006.01)
*G06F 13/28* (2006.01)

(52) U.S. Cl.
CPC ..................................... *G06F 13/28* (2013.01)

(58) Field of Classification Search
CPC ......................... G06F 13/28; G06F 2213/2802
USPC ............................................................ 710/22
See application file for complete search history.

(56) References Cited

U.S. PATENT DOCUMENTS

| | | | | |
|---|---|---|---|---|
| 5,970,229 A * | 10/1999 | Thomas et al. | ............... | 709/212 |
| 6,026,443 A * | 2/2000 | Oskouy et al. | ............... | 709/230 |
| 6,992,978 B1 * | 1/2006 | Humblet et al. | ............... | 370/228 |
| 7,571,216 B1 * | 8/2009 | McRae et al. | ................. | 709/213 |
| 7,680,963 B2 * | 3/2010 | Go et al. | ......................... | 710/22 |

* cited by examiner

*Primary Examiner* — Titus Wong
(74) *Attorney, Agent, or Firm* — Winston Hsu; Scott Margo

(57) ABSTRACT

The invention discloses a DMA system capable of being adapted to various interfaces. The DMA system includes the following advantages: 1) the software porting effort can be reduced when different interfaces are integrated into a SoC; 2) a flexible DMA that could provide protocol transparency and could be ported into different interfaces easily; 3) a scalable DMA that can support unlimited TX/RX scattering/gathering data segments; 4) a reusable DMA that provides user defined TX information (or RX information) and TX message (or RX message) field; and 5) a high performance DMA that support unaligned segment data pointers and unlimited scattering/gathering data segments, so as to reduce extra memory copies by CPU.

16 Claims, 9 Drawing Sheets

DIRECT MEMORY ACCESS SYSTEM AND METHOD USING THE SAME

CROSS REFERENCE TO RELATED APPLICATIONS

This application is a continuation of U.S. application Ser. No. 12/247,019 filed on Oct. 7, 2008.

BACKGROUND OF THE INVENTION

1. Field of the Invention

The invention relates to a direct memory access (DMA) system and, more particularly, to a unified DMA system adapted to various networking protocol such as WLAN, Ethernet, WiMAX, UWB, USB, and so on.

2. Description of the Prior Art

For any kind of high-performance network interface cards (NICs), a dedicated hardware for transferring TX/RX packets is widely used to improve the performance. Generally, this dedicated hardware utilizes the technology called direct memory access (DMA), which allows direct data transfer between certain interfaces and memories in a computer system without the intervention of central processing units (CPU).

Please refer to FIG. 1, which illustrates the operation flow of a conventional DMA device 10. When a CPU 12 plans to send a TX packet 14, it stores a buffer address 160 of the packet and some related packet information 162 into a TX descriptor 16 and then resets an associated owner bit 164. Subsequently, CPU 12 would inform DMA device 10 to move TX packet 14 from memory 18 to interface 20. After transmitting the TX packet 14, DMA device 10 sets owner bit 164 as 1 and inform CPU 12 that the transmission of TX packet 14 is finished.

When receiving an RX packet 22, CPU 12 allocates an available buffer space in memory 18 for the packet, stores a buffer address 240 into an RX descriptor 24, and then resets an associated owner bit 244. When the RX packet 22 is transferred from interface 20, DMA device 10 first checks the owner bit 244 of RX descriptor 24. Then, DMA device 10 transfers RX packet 22 from interface 20 to memory 18. After RX packet 22 is moved to memory 18, DMA device 10 writes a packet information 242 into the RX descriptor 24 and sets owner bit 244 as 1 and then informs CPU 12 of the completeness of receiving RX packet 22.

In order to improve the performance and reduce the requirement of First-In-First-Out (FIFO) memory, most conventional DMA devices support multiple TX/RX descriptors by, for instance, arranging descriptors as descriptor chains or descriptor rings. A typical TX descriptor chain is shown in FIG. 2, and a typical TX descriptor ring is shown in FIG. 3.

Although most DMA devices have similar operation rules, the designs of the DMA devices are not exactly the same. In particular, DMA devices will be different when the attached network media (e.g., Ethernet, WLAN, ADSL, WiMAX, and so on) changes. Therefore, when more and more interfaces are integrated into a system on chip (SoC), non-unified DMA descriptor architectures and semantic languages would increase hardware verification effort and software porting effort significantly. Moreover, different DMA engines for different interfaces are hard to maintain from the perspective of ASIC design.

Therefore, the scope of the invention is to provide a unified DMA system to solve the aforesaid problems.

SUMMARY OF THE INVENTION

An object of the present invention is to provide a unified DMA system which allows different interfaces to share the same DMA engine.

According to an embodiment of the present invention, the DMA system is used for transmitting/receiving packets between an interface and a memory. The DMA system includes a DMA transmitter and a DMA receiver. The DMA transmitter transmits a TX packet based on a TX descriptor and appends a TX information to the head of the TX packet based on the TX descriptor. On the other hand, the DMA receiver receives an RX packet based on an RX descriptor and appends an RX information to the tail of the RX packet. In this embodiment, the TX descriptor and the RX descriptor can be selectively embedded the interface or the memory.

The TX information is used for informing the interface about the TX path, so that the interface can perform the packet processing procedure. When the information to be transmitted is too large to be completely filled into the TX information, the DMA transmitter of the invention can selectively append a TX message between the TX packet and the TX information.

The RX information is used for storing the receiving state of packets. If the RX information is too small for some applications, the DMA receiver can selectively append an RX message to the head of the RX packet, so as to transmit more necessary receiving statuses.

From the perspective of DMA, since the TX message (or RX message) and TX packet (or RX packet) are transmitted as a TX payload (or an RX payload), the DMA device does not know the semantic program and data length of the TX message (or RX message), and designers can decide to fill what information into the TX message (or RX message). Thereby, the DMA system of the invention can be formatted based on different interfaces and adapted to various networking protocols such as WLAN, Ethernet, WiMAX, UWB, USB, and so on.

The advantage and spirit of the invention may be understood by the following recitations together with the appended drawings.

BRIEF DESCRIPTION OF THE APPENDED DRAWINGS

Figure 7A:
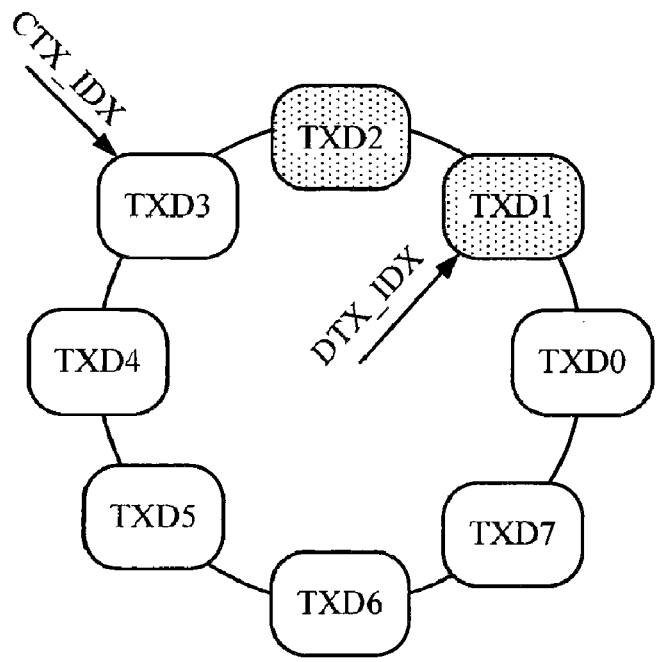
Figure 7B:
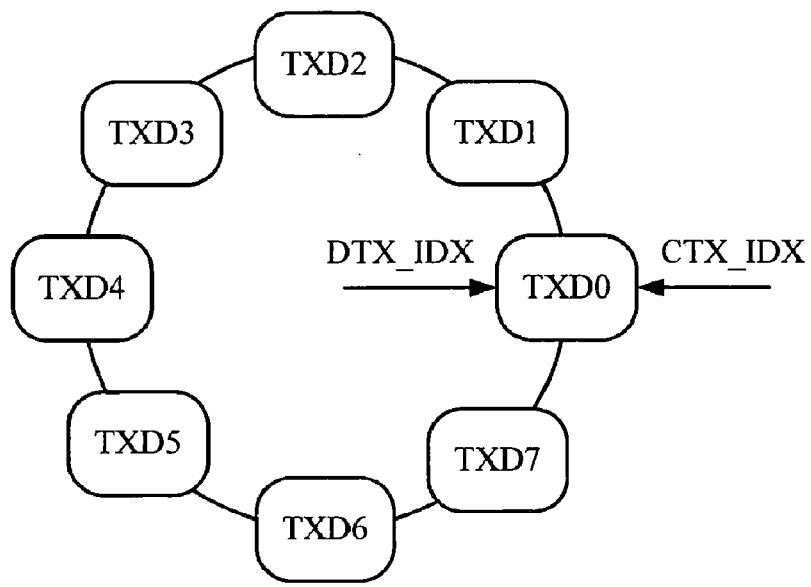

FIG. 7(A) and FIG. 7(B) respectively illustrate the ownership of the TX descriptor indicated by two hardware indexes according to an embodiment of the present invention.

Figure 8A:
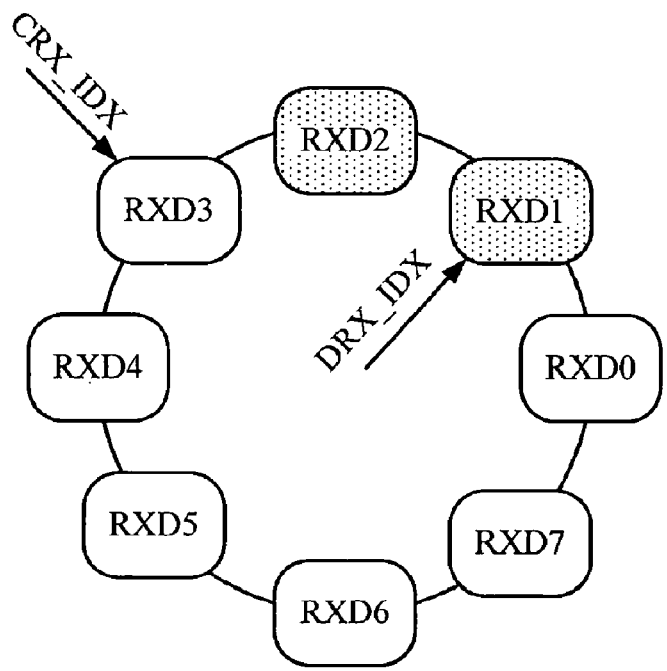
Figure 8B:
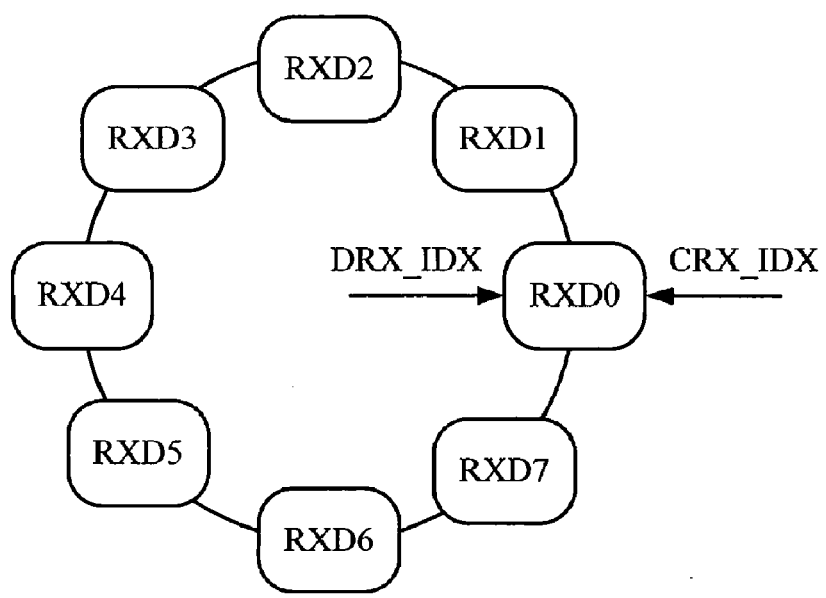

FIG. 8(A) and FIG. 8(B) respectively illustrate the ownership of the RX descriptor indicated by two hardware indexes according to an embodiment of the present invention.

Figure 9:
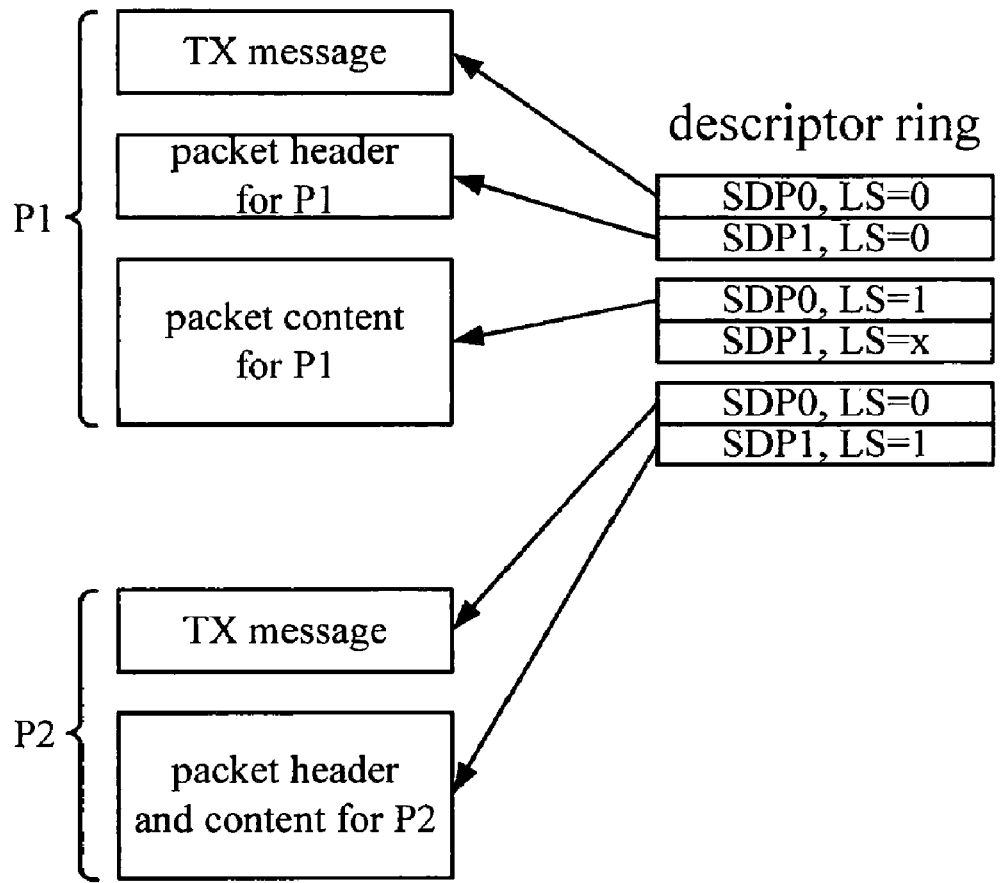

FIG. 9 is a schematic diagram illustrating a carried TX message.

DETAILED DESCRIPTION OF THE INVENTION

Figure 1:
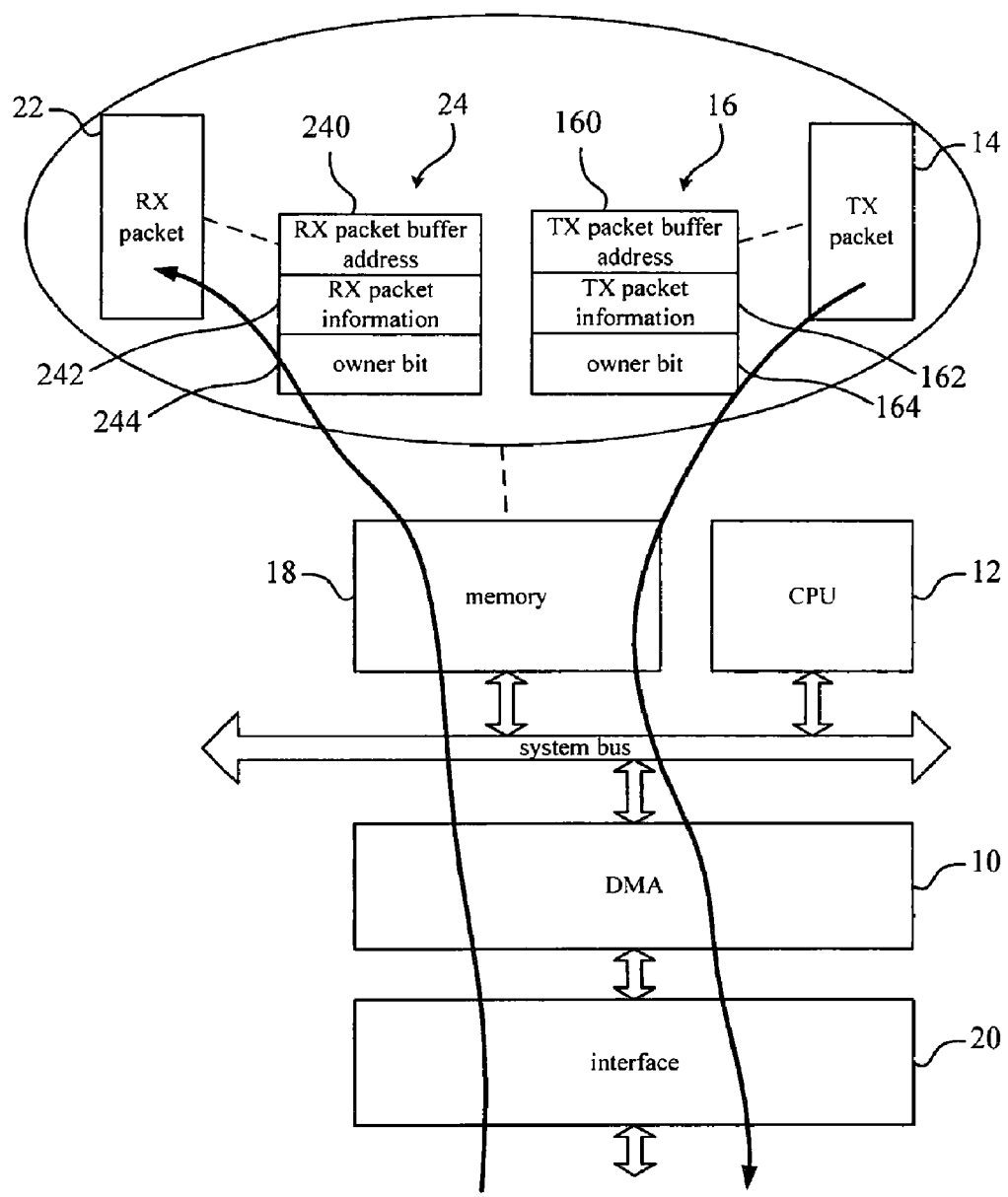
FIG. 1 illustrates the operation flow of a DMA device 10 in the prior arts.
Figures 2, 3:
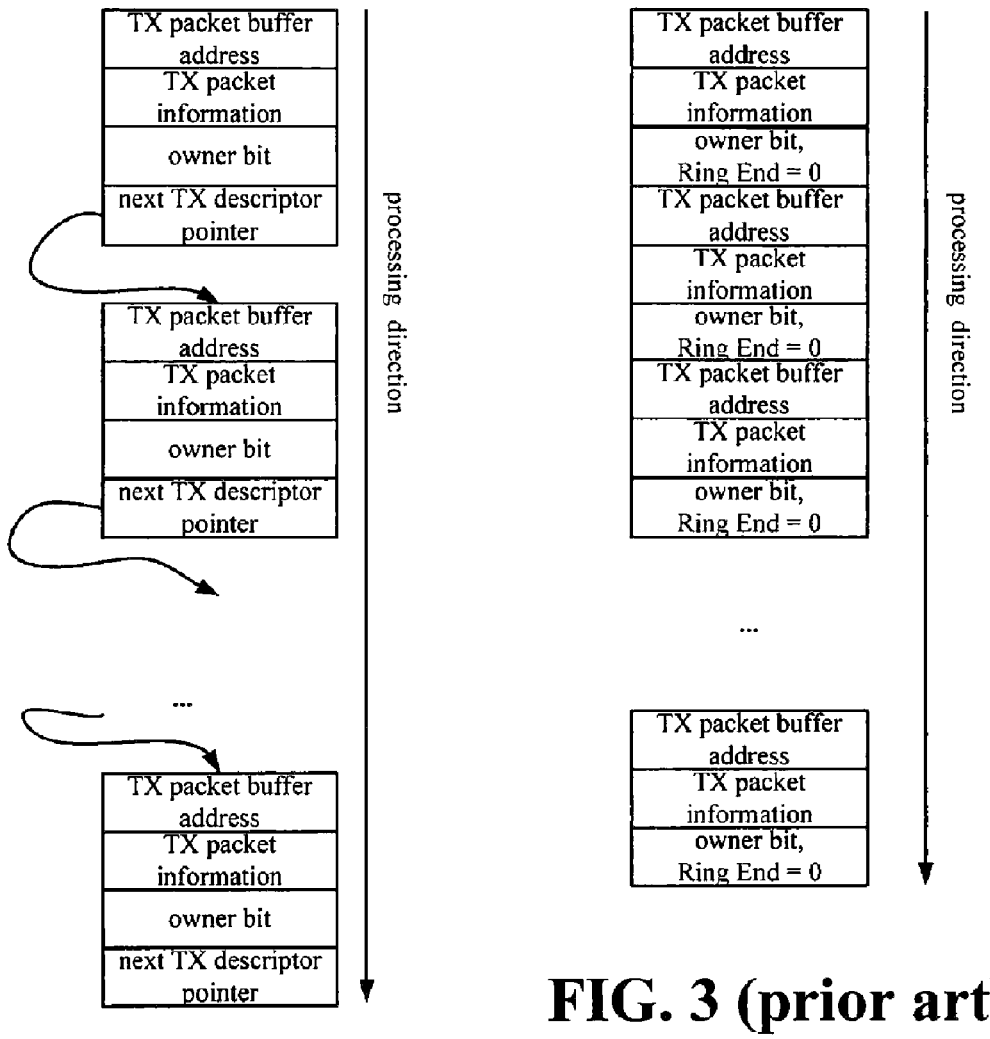
FIG. 2 is a schematic diagram of a typical TX descriptor chain.
FIG. 3 is a schematic diagram of a typical TX descriptor ring.
Figure 4A:
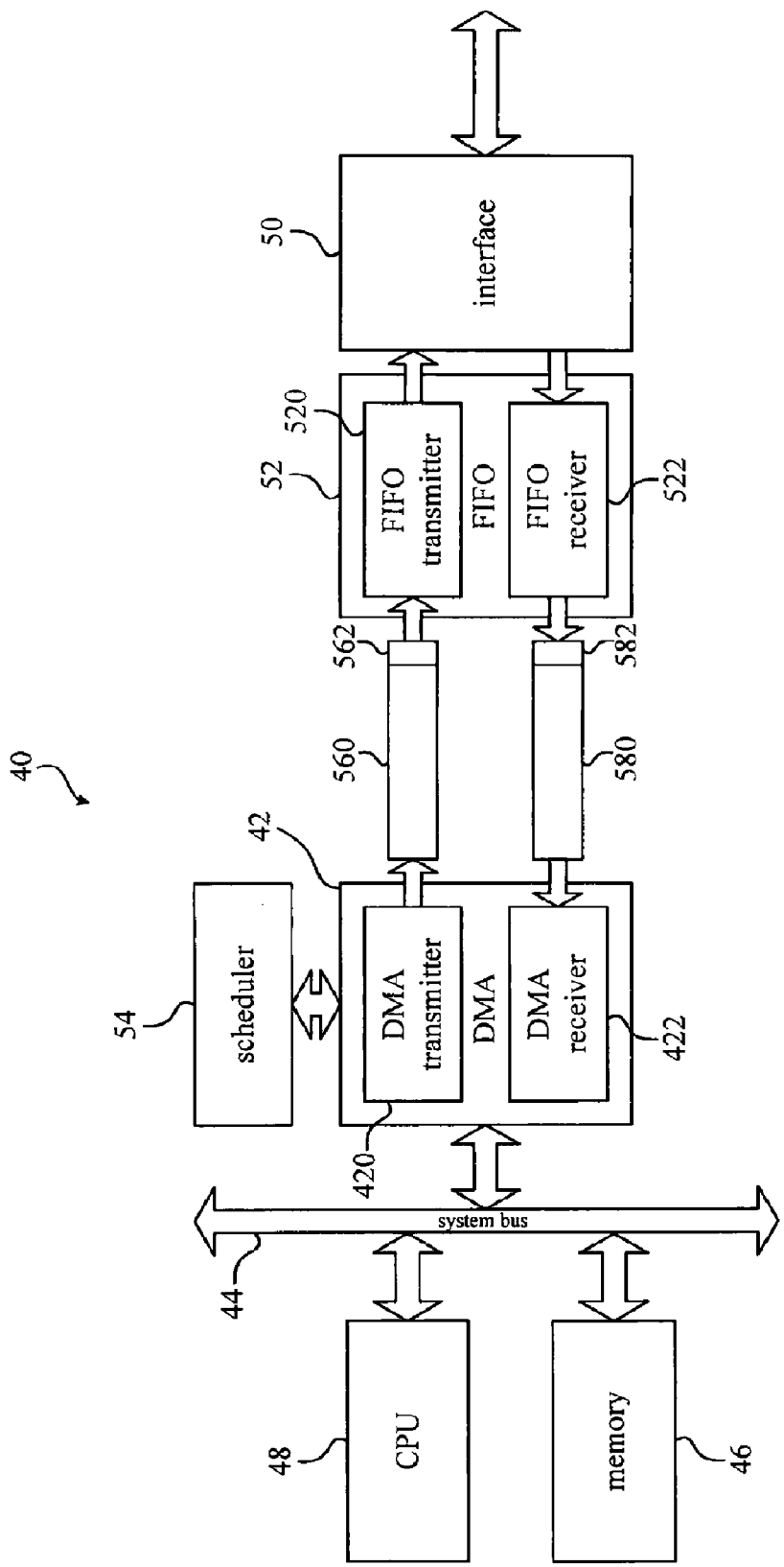
FIG. 4(A) is a functional diagram illustrating a DMA system in an embodiment according to the invention.

Please refer to FIG. 4(A), which illustrates a functional block diagram of a DMA system 40 in an embodiment according to the invention. As shown in FIG. 4(A), a DMA device 42 communicates with a memory 46 and a CPU 48 via a system bus 44. DMA device 42 includes a DMA transmitter 420 and a DMA receiver 422. An interface 50 is connected to DMA device 42 via a FIFO memory 52. FIFO memory 52 includes a FIFO transmitter 520 and a FIFO receiver 522. A scheduler 54 is connected to DMA device 42 for arranging the sequence of accessing TX descriptor rings.

As shown in FIG. 4(A), when transmitting a TX packet 560, DMA transmitter 420 appends a TX information 562 to the head of TX packet 560 based on a TX descriptor (described later). TX information 562 is used for informing interface 50 of the transmitting path, so that interface 50 can perform a packet processing procedure. Typical TX information 562 can include TCP/UDP/IP checksum offload, cyclic redundancy check (CRC) calculation, packet destination port, and so on. TX information 562 is a part of the TX descriptor and is appended to the TX descriptor when TX packet 560 is transferred from memory 46 to interface 50 by DMA transmitter 420.

Similarly, as shown in FIG. 4(A), when DMA receiver 422 receives an RX packet 580, DMA receiver 422 appends an RX information 582 to the tail of RX packet 580 based on an RX descriptor (described later). RX information 582 is used for storing the receiving status of packets such as CRC check result, packet type, and so on.

Figure 4B:
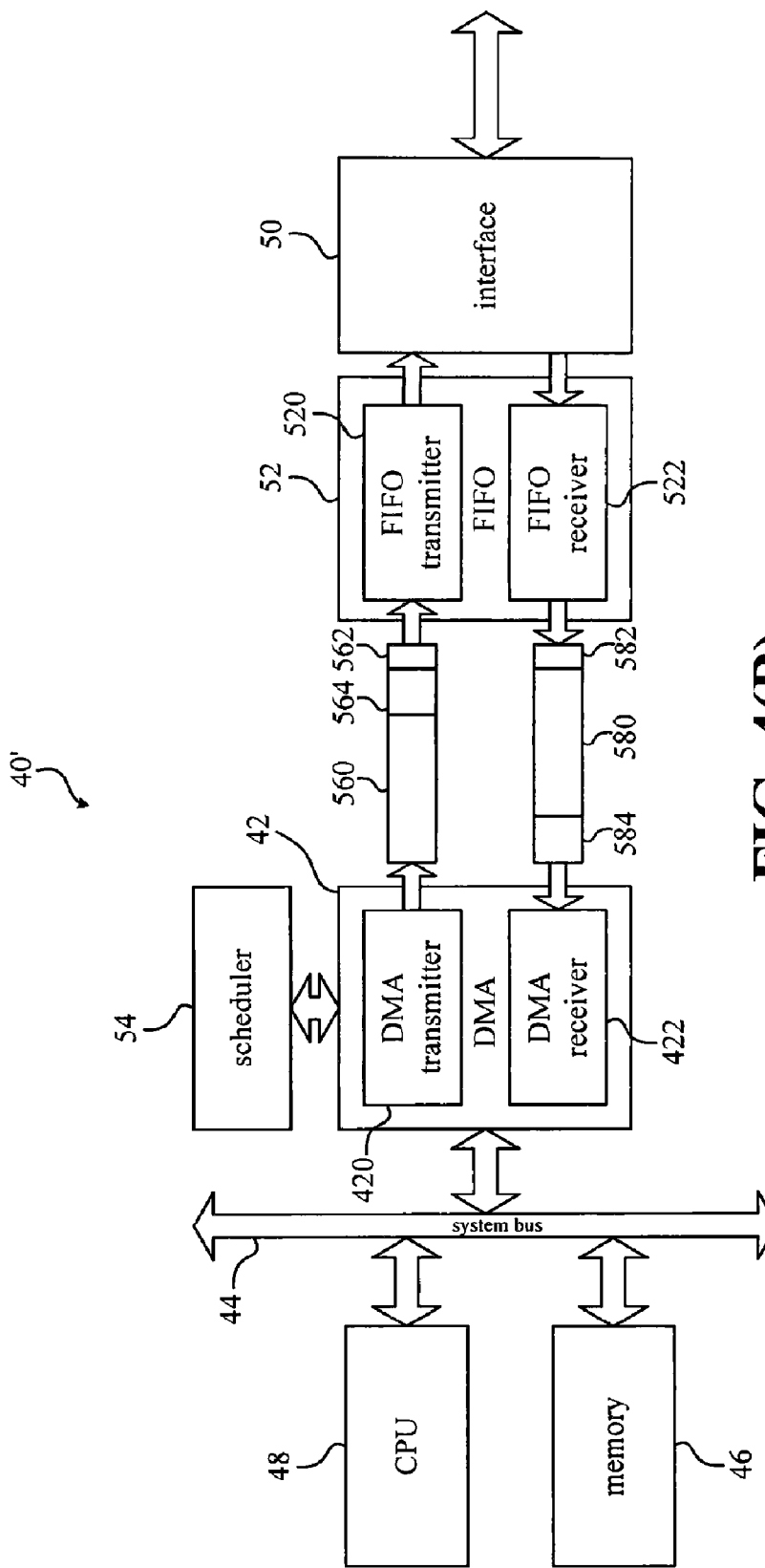
FIG. 4(B) is a functional diagram illustrating a DMA system in another embodiment according to the invention.

Please refer to FIG. 4(B), which illustrates a functional block diagram of a DMA system 40' in another embodiment according to the invention. When the information to be transmitted is too large to be completely filled into TX information 562, DMA transmitter 420 can selectively append an extended TX information (i.e. a TX message 564 shown in FIG. 4(B)) between TX packet 560 and TX information 562. In the same manner, if RX information 582 is too small for certain applications, DMA receiver 422 can also selectively append a RX message 584 to the head of the RX packet 580 for carrying more necessary receiving statuses such as description keys, received signal strength (RSS) in WLAN applications, and so on.

From the perspective of DMA device 42, DMA transmitter 420 treats and processes both TX message 564 and TX packet 560 as TX payloads, and DMA receiver 422 treats and processes both RX message 584 and RX packet 580 as RX payloads. In other words, DMA device 42 does not have to know the semantic language and data length of TX message 564 or RX message 584. Thereby, DMA device 42 of the invention can be formatted based on various interface devices and adapted to various networking protocols such as WLAN, Ethernet, WIMAX, UWB, USB, and so on.

Figure 5A:
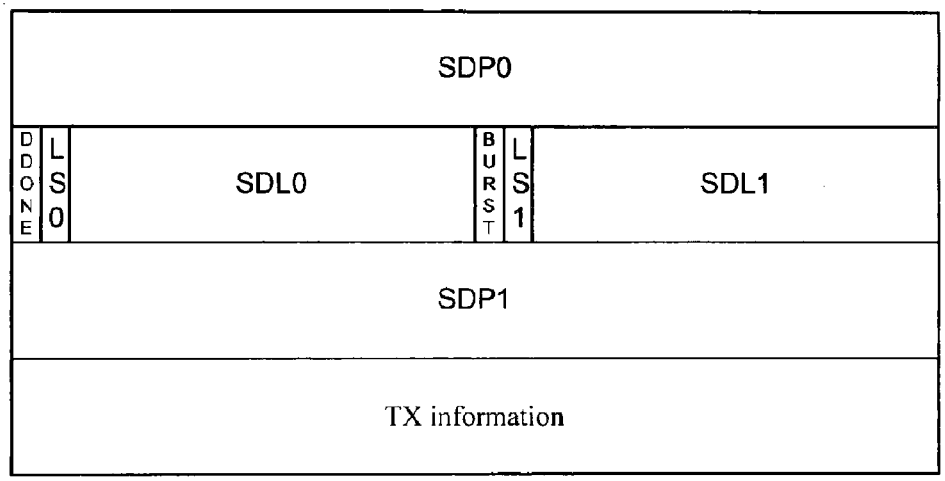
FIG. 5(A) illustrates the format of a TX descriptor in an embodiment according to the invention.
Figure 5B:
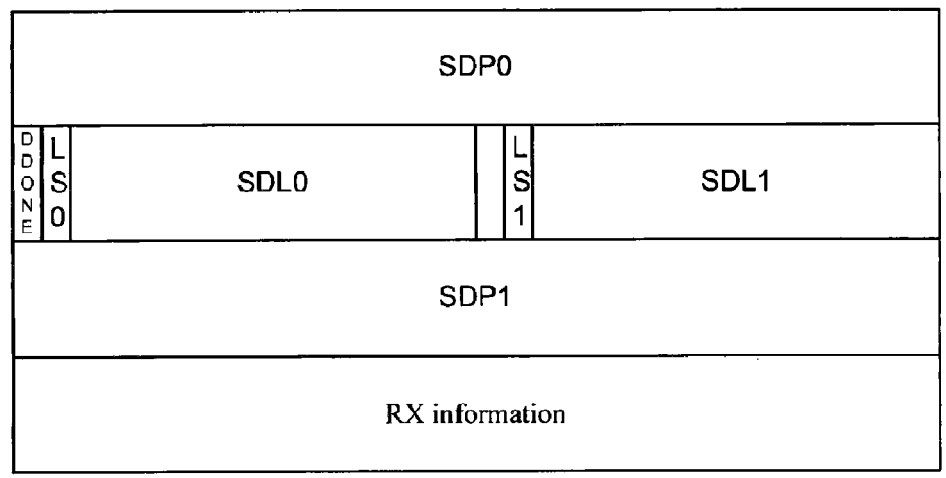
FIG. 5(B) illustrates the format of an RX descriptor in an embodiment according to the invention.

Please refer to FIG. 5(A) and FIG. 5(B). FIG. 5(A) shows the format of a TX descriptor 60 in an embodiment according to the invention. FIG. 5(B) is shows the format of an RX descriptor 62 in an embodiment according to the invention. DMA system 40 of the invention includes TX descriptor 60 and RX descriptor 62. In this embodiment, both TX descriptor 60 and RX descriptor 62 can be selectively embedded in interface 50 or memory 46.

As shown in FIG. 5(A), TX descriptor 60 includes two pointers (SDP0 and SDP1) for indicating the memory address of TX packet 560. The data length of TX packet 560 is stored in SDL0 and SDL1 of TX descriptor 60. In addition, the bit LS is used for indicating which data segment is the last data segment of TX packet 560. For example, if the bit LS is set as 1, the data segment (pointed by SDP0 or SDP1) is the last one of TX packet 560. As shown in FIG. 5(A), the data segment pointed by SDP1 is the last one of TX packet 560.

Figure 6:
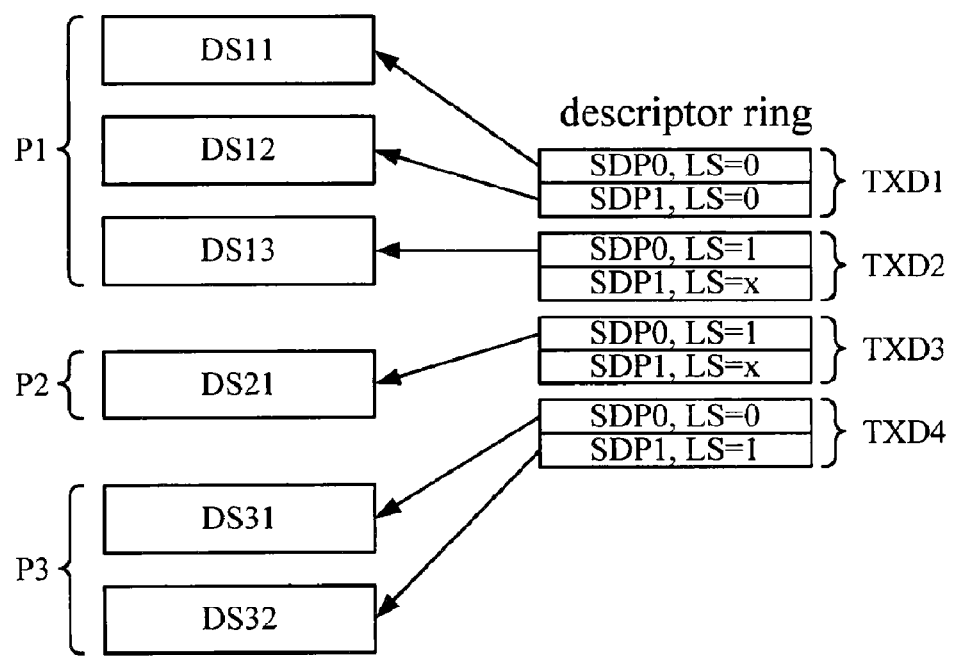
FIG. 6 is illustrating the relationship between data segments of a packet and the TX descriptor.

In order to support the scattered/gathered data segments, TX packet 560 can be divided into a plurality of data segments and respectively stored into different memory sections. These data segments of TX packet 560 are associated by one or more TX descriptors 60. Please refer to FIG. 6, which illustrates the relationship between the data segments of the packet and the TX descriptor. A packet P1 is divided into three data segments: DS11, DS12, and DS13. DS11 and DS12 are related to the descriptor TXD1, and DS13 is related to the descriptor TXD2. A packet P2 includes only one data segment DS21 and relative to the descriptor TXD3. A packet P3 is divided into two data segments: DS31 and DS32, which are both relative to the descriptor TXD4. Because the data segments DS13, DS21, and DS32 are respectively the last data segments of P1, P2, and P3, their bit LS are all set as 1.

In addition, before using TX descriptor 60, DMA transmitter 420 will first check a DMA Done (DDONE) bit (as shown in FIG. 5(A)). If the DDONE bit is 0, DMA transmitter 420 has an ownership to use and transfers the data segments pointed by SDP0 and SDP1. After finishing transferring the data, DMA transmitter 420 returns the ownership of TX descriptor 60 to the CPU by writing 1 to the DDONE bit. At last, TX information 562 will be appended to the head of TX packet 560 by DMA transmitter 420 before the packet is sent to interface 50.

In most networking applications, a plurality of TX descriptor rings are used to support the quality of service (QoS). Scheduler 54 in FIG. 4(A) is used to decide which TX packet is going to be transferred first. If a user wants to guarantee two or more packets in the same TX descriptor ring can be transferred consecutively, the user can inform DMA transmitter 420 by setting a BURST bit (as shown in FIG. 5(A)). Besides, because TX information 562 is transferred by DMA transmitter 420, the user can define TX information 562 according to actual applications.

On the other hands, as shown in FIG. 5(B), RX descriptor 62 includes two pointers (SDP0 and SDP1) for indicating the memory address of RX packet 580. And the data length of RX packet 580 is stored in SDL0 and SDL1 of RX descriptor 62. In addition, the bit LS is used for indicating which segment if the last data segment of RX packet 580. For example, if the bit LS is set as 1, the corresponding data segment (pointed by SDP0 or SDP1) is the last one of RX packet 580. As shown in FIG. 5(B), the data segment pointed by SDP1 is the last one of RX packet 580.

In this embodiment, the operation rules of RX descriptor 62 are similar to those of TX descriptor 60. The major difference is that unused data segment buffers are prepared and associated with the pointers (SDP0 and SDP1) and the data lengths (SDL0 and SDL1) of RX descriptors 62. When DMA receiver 422 wants to receive RX packet 580, it first checks if the data segments (SDL0 and SDL1) are large enough for storing RX packet 580. If the space is not enough, DMA receiver 422 uses other pointers to store the residual parts of RX packet 580. After the packet is completely transferred to memory 46, DMA receiver 422 will update the data length to indicate the length of the last data segment and set the associated LS bit as 1.

In the present invention, in addition to utilizing the DDONE bit to manage the ownership of the TX descriptor, DMA system 40 can further provide two hardware indexes: a CTX_IDX and a DTX_IDX for indicating the ownership of the TX descriptor. Please refer to FIG. 7(A) and FIG. 7(B), which illustrate the operation rule of the two indexes. As shown in FIG. 7(A), when the TX descriptors (TXDn, n=0.about.7) pointed by the DTX_IDX and the CTX_IDX are different, DMA transmitter 420 processes the TX descriptor pointed by the DTX_IDX. As shown in FIG. 7(B), when the TX descriptors pointed by the DTX_IDX and the CTX_IDX are the same, DMA transmitter 420 stops the processing procedure.

In the present invention, in addition to utilizing the DDONE bit to manage the ownership of the RX descriptor, DMA system 40 can further provide two hardware indexes: a CRX_IDX and a DRX_IDX for indicating the ownership of the RX descriptor. Please refer to FIG. 8(A) and FIG. 8(B), which illustrate the operation rule of the two indexes. The operation rule of the CRX_IDX and the DRX_IDX is similar to that of the CTX_IDX and the DTX_IDX, so it is not described again.

One benefit of this DMA system 40 of the invention is that users are allowed to define their own information/messages to communicate with interface 50. There are two ways for carrying these information/messages. If the message is short, it can be carried by TX information 562 or RX information 582. If the message is too large to be filled into TX information 562 or RX information 582, TX message 564 or RX message 584 can be utilized. From the perspective of DMA, the DMA device is not aware of how much message is carried in TX/RX payloads. In other words, the DMA device will treat the carried messages as a portion of a packet. Please refer to FIG. 9, which illustrates a schematic diagram of a carried TX message. The TX message can be connected to SDP0 as the first data segment of a packet, so that no extra memory space is required.

Compared to the prior arts, the DMA system of the invention has the following advantages:

can be adapted to various interfaces;

can reduce the effort of porting software when various interfaces are integrated into a SoC;

can be ported into different interfaces easily since a transparent networking protocol is provided;

users can define the TX/RX information and the TX/RX message by themselves; and users can define the TX/RX information and the TX/RX message by themselves; and With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A direct memory access (DMA) system for directly accessing a memory and coupled to an interface for transmitting packets between a host terminal and a client terminal, wherein the host terminal comprises the memory storing a TX packet and a corresponding TX descriptor including a TX information, the DMA system comprising: a DMA transmitter for transmitting the TX information and the TX packet to the interface according to the TX descriptor, and appending the TX information to the head of the TX Packet based on the TX descriptor, wherein the TX information is predetermined to be used for the host terminal communicating with the client terminal by the interface, and the TX information does not contain data which the DMA transmitter having to use; a DMA receiver for receiving an RX packet and an RX information from the interface according to a RX descriptor, wherein the RX information is predetermined to be used for the client terminal communicating with the host terminal by the interface, and the RX information does not contain data which the DMA receiver having to use; wherein the TX descriptor comprises at least one pointer, at least one length of the TX packet, and the TX information; wherein the RX descriptor comprises at least one pointer, at least one length of RX packet, and the RX information; and wherein the DMA transmitter selectively appends a TX message between the TX packet and the TX information, and the DMA receiver selectively appends an RX message between the RX packet and the RX information, wherein the TX message and the RX message are predetermined to be used for communication between the host terminal and the client terminal.

2. The DMA system of claim 1, wherein at least one of the TX message and the RX message has a variable length.

3. The DMA system of claim 1, further comprising at least two first hardware indexes and at least two second hardware indexes, wherein the first hardware indexes are used for indicating an ownership of the TX descriptor, and the second hardware indexes are used for indicating an ownership of the RX descriptor.

4. The DMA system of claim 1, wherein the TX descriptor is a TX descriptor ring, and the RX descriptor is an RX descriptor ring.

5. The DMA system of claim 4, further comprising a scheduler for arranging the sequence of accessing the TX descriptor ring.

6. A method for transmitting/receiving a packet in a direct memory access (DMA) system, the DMA system being used for directly accessing a memory and coupled to an interface for transmitting packets between a host terminal and a client terminal, wherein the host terminal comprises the memory storing a TX packet and a corresponding TX descriptor including a TX information, the method comprising the steps of: transmitting the TX packet and the TX information to the interface according to a TX descriptor, and appending the TX information to the head of the TX Packet based on the TX descriptor, wherein the TX information is predetermined to be used for the host terminal communicating with the client terminal by the interface, and the TX information does not contain data which the DMA transmitter having to use; receiving an RX packet and an RX information from the interface according to an RX descriptor, wherein the RX information is predetermined to be used for the client terminal communicating with the host terminal by the interface, and the RX information does not contain data which the DMA receiver having to use; selectively appends a TX message between the TX packet and the TX information; and selectively appends an RX message between the RX packet and the RX information; wherein the TX message and the RX message are predetermined to be used for communication between the host terminal and the client terminal; and wherein the TX descriptor comprises at least one pointer, at least one length of the TX packet, and the TX information; wherein the RX descriptor comprises at least one pointer, at least one length of the RX packet, and the RX information.

7. The method of claim 6, wherein at least one of the TX message and the RX message has a variable length.

8. The method of claim 6, further comprising the steps of:
indicating an ownership of the TX descriptor with at least two first hardware indexes; and
indicating an ownership of the RX descriptor with at least two second hardware indexes.

9. The method of claim 6, wherein the TX descriptor is a TX descriptor ring, and the RX descriptor is an RX descriptor ring.

10. The method of claim 9, further comprising the step of:
arranging the sequence of accessing the TX descriptor ring with a scheduler.

11. The DMA system of claim 1, wherein the DMA receiver is further utilized for appending a RX information to the tail of the RX packet based on the RX descriptor.

12. The DMA system of claim 1, wherein the TX information comprises at least one of checksum offload, cyclic redundancy check calculation, and packet destination port, and the RX information comprises a receiving status of the RX packet.

13. The DMA system of claim 1, wherein at least one of the TX information and the RX information can be defined by at least one user.

14. The method of claim 6 further comprises appending a RX information to the tail of the RX packet based on the RX descriptor.

15. The method of claim 6, wherein the TX information comprises at least one of checksum offload, cyclic redundancy check calculation, and packet destination port, and the RX information comprises a receiving status of the RX packet.

16. The DMA system of claim 6, wherein at least one of the TX information and the RX information can be defined by at least one user.

\* \* \* \* \*